United States Patent [19]
Perkins

[11] 3,861,527
[45] Jan. 21, 1975

[54] PACKAGE OF COLLATED FASTENERS

[75] Inventor: Garry R. Perkins, Palatine, Ill.

[73] Assignee: Spotnails, Inc., Rolling Meadows, Ill.

[22] Filed: Dec. 4, 1972

[21] Appl. No.: 311,623

[52] U.S. Cl.................................... 206/344, 85/21
[51] Int. Cl............................................. B65d 85/24
[58] Field of Search..... 85/21, 17; 206/56 DF, 65 S, 206/344, 343; 229/DIG. 12

[56] References Cited
UNITED STATES PATENTS

| | | | |
|---|---|---|---|
| 2,126,585 | 8/1938 | Stone | 85/21 |
| 2,226,006 | 12/1940 | Maze | 85/21 |
| 2,317,231 | 4/1943 | Swedman | 206/56 DF |
| 2,909,781 | 10/1959 | Ollig et al. | 206/56 DF |
| 3,067,424 | 12/1962 | Decot et al. | 206/56 DF |
| 3,137,858 | 6/1964 | Powers | 206/56 DF |
| 3,152,334 | 10/1964 | Lingle | 206/344 |
| 3,358,822 | 12/1967 | O'Connor | 206/56 DF |

Primary Examiner—William I. Price
Assistant Examiner—Steven E. Lipman

[57] ABSTRACT

A fastener is provided which is collated with like fasteners arranged in abutting side-by-side relation. Each fastener has an elongated shank provided with a pointed leading end. An enlarged head is formed at the trailing end of the shank. The exterior of the shank has formed thereon a plurality of longitudinally spaced shank-encircling barbs. The portion of the shank disposed intermediate adjacent barbs is gently tapered towards the leading end of the shank. The outer extremity of each barb is disposed rearwardly of the inner extremity thereof.

2 Claims, 5 Drawing Figures

PATENTED JAN 21 1975
3,861,527
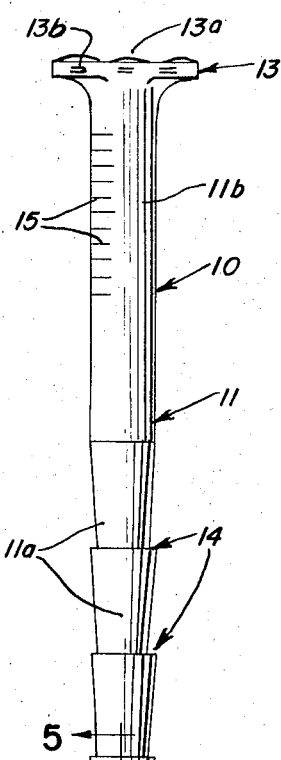
FIG. 1
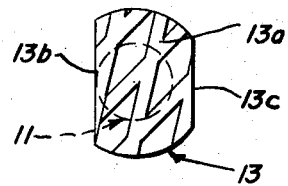
FIG. 2
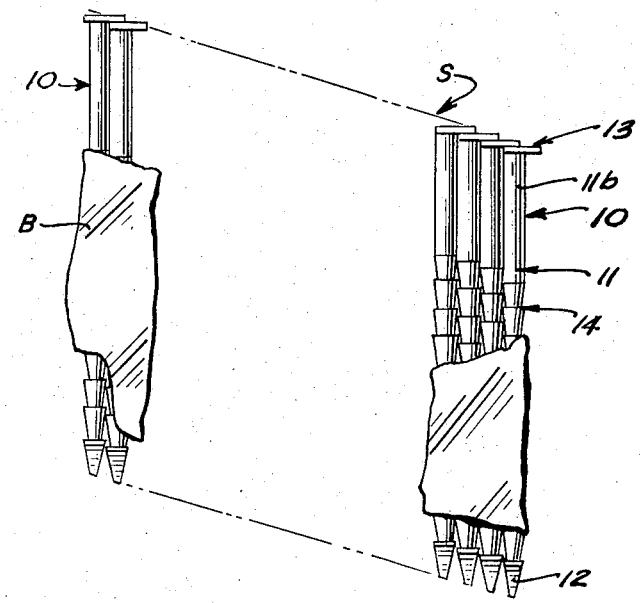
FIG. 3
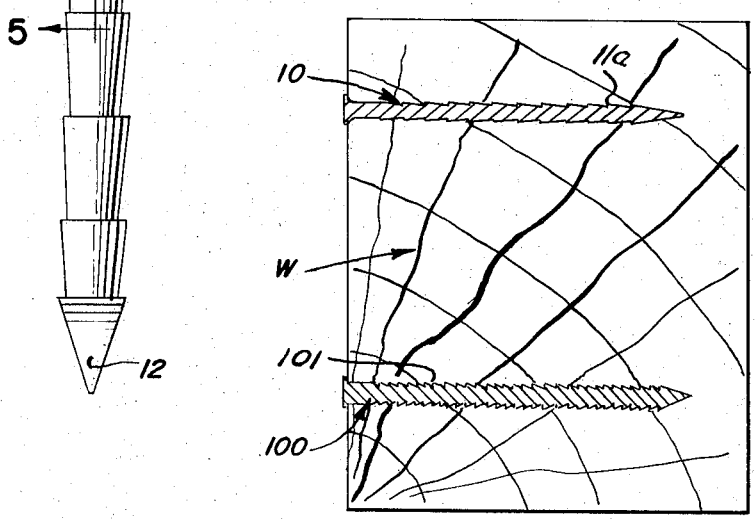
FIG. 4
FIG. 5

PACKAGE OF COLLATED FASTENERS

BACKGROUND OF THE INVENTION

Various fasteners such as nails having deformed shanks have heretofore been provided, but because of certain structural characteristics, they have been beset with one or more of the following shortcomings: (a) inferior holding strength; (b) the deformed shank of the fastener when driven into the work piece produced a broaching effect; (c) the fastener had a tendency to twist while being driven in place; (d) the fastener was not capable of being readily collated so as to form a flexible, yet compact strip; and (e) the head design was susceptible to cause skip-off when the fastener was driven by a high speed powered driving tool.

Summary of the Invention

Thus, it is an object of the invention to provide an improved fastener which is not beset with the aforenoted shortcomings.

It is a further object of the invention to provide an improved fastener which may be readily collated with like fasteners by utilizing a minimal amount of bond coating, thereby resulting in a significantly less amount of debris being formed and, thus, eliminate the possibility of such debris shattering and becoming hazardous when the fasteners are driven into the work piece by a high speed nailing tool.

It is a still further object of the invention to provide an improved fastener having a deformed shank which may be readily produced from ferrous or nonferrous metals.

It is a still further object of the invention to provide an improved fastener having a deformed shank which may be readily used with a variety of powered nailers and will not cause inordinate wear of any components of the nailers.

It is a still further object of the invention to provide an improved fastener which provides a minimum of resistance when being driven into the work piece and produces substantial resistance when being withdrawn from the work piece.

Further and additional objects will appear from the description, accompanying drawing and appended claims.

In accordance with one embodiment of the invention, an improved fastener is provided which is adapted to be collated with like fasteners arranged in abutting side-by-side relation. The heads of the collated fasteners are arranged in stepped relation. Each of the collated fasteners includes an elongated shank having a pointed leading end and an enlarged head formed on the trailing end of the shank. The shank is provided with a plurality of longitudinally spaced shank-encompassing barbs. The portions of the shank intermediate adjacent barbs are gently tapered towards the shank leading end. The outer extremity of each barb extends rearwardly relative to the inner extremity. The head of each fastener is provided with a flat peripheral segment which is disposed substantially tangential to the shank exterior. The flat peripheral segment of the head of one collated fastener is disposed beneath the head of an adjacent fastener and is in engagement with the shank exterior of said adjacent fastener.

DESCRIPTION

For a more complete understanding of the invention, reference should be made to the drawing wherein:

FIG. 1 is an enlarged side elevational view of one form of the improved fastener;

FIG. 2 is a top plan view of the head of the fastener shown in FIG. 1;

FIG. 3 is a fragmentary side elevational view of a plurality of improved fasteners arranged in collated relation;

FIG. 4 is a longitudinal sectional view of the improved fastener and a conventional fastener shown driven into a wooden block; and FIG. 5 is an enlarged fragmentary sectional view taken along line 5—5 of FIG. 1.

Referring now to the drawing and more particularly to FIG. 1, one form of the improved fastener or nail 10 is shown which is particularly suitable to be collated with like fasteners to form a strip S to be used in a variety of powered high speed driving tools, not shown. Fastener 10 may be readily formed of ferrous or nonferrous metal and includes an elongated shank 11 having a pointed leading end 12. The length and diameter of the shank may vary from that shown and will depend upon the intended use of the fastener. An enlarged head 13 is formed on the trailing end of the shank 11.

The exterior of the shank is deformed so as to include a plurality of longitudinally spaced barbs 14. The barbs may or may not be of like configuration, but each encircles the shank exterior. In the illustrated embodiment, the barbs 14 are disposed substantially transversely of the shank axis. If desired, however, the barbs may have a slight lead, not shown.

The portion 11a of the shank disposed intermediate adjacent barbs has a gentle taper towards the leading end 12 of the shank. The taper is preferably less than 5° to the shank axis. A substantial portion 11b of the shank disposed adjacent the head 13 is not deformed with barbs. In lieu of the barbs, shank portion 11b might be provided with conventional gripper marks 15.

The head 13 preferably has a roughened upper surface 13a thereby avoiding the problem of skip-off when the fastener is being driven by the driver blade of a high speed powered tool, such as a pneumatic nailer, not shown. The periphery of the head 13 is provided with a first flat segment 13b which is disposed in substantial tangential relation with the exterior of shank portion 11b. A second flat peripheral segment 13c may be formed in head 13, but disposed outwardly from the shank exterior. The first and second peripheral segments are preferably in parallel relation, as seen in FIG. 2. Various other shaped heads may be used, if desired, provided there is at least one flat peripheral segment which is disposed in substantial tangential alignment with respect to the shank exterior.

In FIG. 4 the broaching effect on a work piece W caused by a conventional fastener 100 having a deformed shank 101 when said fastener is driven into the work piece is shown. By way of contrast and comparison, the lack of the broaching effect, when using the improved fastener, is also shown in FIG. 4. The work piece W illustrated in FIG. 4 is a wooden block. The nonbroaching effect resulting from the use of the improved fastener is attributed to the gentle taper of the portions 11a of the shank intermediate the adjacent barbs. Thus, with such a gentle taper, the shank readily penetrates the work piece and moves the wood fibers out of their normal position; however, due to the inherent memory of such fibers, they seek to return to their original position and, thus, squeeze the nail shank.

With prior nail constructions 100, the deformed shanks thereof included a plurality of barbs or serrations which were closely spaced longitudinally with the result that the space between adjacent barbs was abruptly tapered, causing the outer extremity of each barb to assume a knife edge configuration. Thus, as the deformed shank penetrated the work piece, the outer knife edge extremities of the shank barbs exerted a cutting action on the adjacent wood fibers with the result that the inherent memory characteristic of the fibers was seriously diminished.

Because of the flat segment 13b of the head 13, the improved fasteners may be readily collated in a compact strip S. It will be noted that the heads of the fasteners are arranged in a stepped relation with the head of the leading fastener being nested beneath the head of the succeeding fastener. The flat peripheral segment 13b permits the shanks of the adjacent fasteners in the strip S to contact one another throughout a substantial portion of each shank. Thus, when the leading fastener of the strip is severed therefrom by the moving driver blade of the nailing tool, not shown, the succeeding fastener in the strip is not disturbed.

In FIG 5, the configuration of the shank barbs 14 is more clearly shown wherein the outer extremity 14a of each barb encompasses the shank and is undercut so that the inner extremity or base 14b thereof is forwardly disposed relative to the outer extremity. Such a configuration of the barbs produces: (a) extreme resistance to withdrawing the fastener once it has been driven in place; (b) enables the shank to readily penetrate the work piece without producing a broaching effect; and (c) the undercut portion of each barb produces a keying effect for the bond coating B which is applied to the shank exteriors of the assembled fasteners to form the strip S, see FIG 3.

The bond coating B may be a suitable flexible material such as TCP modified nitrocellulose with a phenolic butyral which may be applied by brushing, spraying or dipping. Thus, because of the effective adherence of the coating to the assembled fasteners, due to the keying action of the barbs 14, a minimum amount of the coating material is required to collate the fasteners. The problems of the coating clogging the driver tool, or shattering when the fastener is driven into the work piece have, therefore, been avoided. Heretofore, in prior collated fasteners, tapes as well as substantial amounts of adhesives or bonding materials were normally required, and oftentimes such tapes and/or adhesives would shatter when the driver blade would strike the head end of the fastener, causing debris to be propelled about in a hazardous manner.

Thus, it will be seen that an improved collated fastener has been provided wherein the shank thereof does not require a deep draw of the material and, thus, said material does not require a high tensile strength. The cost of the fastener material is thereby reduced and the method of producing the fastener is simplified. The improved fastener is possessed of a markedly superior holding strength.

I claim:

1. A package of collated fasteners of like configuration arranged in parallel side-by-side relation to form a flexible strip, a flexible bond coating applied to said fasteners to retain same in said relation, each fastener including an elongated shank to which the coating is applied, said shank having a trailing end and a pointed leading end, and an enlarged head formed on the trailing end of said shank; said shank being provided with a plurality of longitudinally spaced barbs, each barb having a continuous outer extremity and a continuous inner extremity, both said outer and inner extremities completely encircling said shank, said outer and inner extremities being disposed in spaced parallel planes substantially transverse to the longitudinal axis of said shank, the portion of said shank intermediate adjacent barbs extending from the outer extremity of one barb to the inner extremity of an adjacent barb and being gently tapered at an angle not exceeding about five degrees towards the axis of said shank and towards the leading end thereof; the outer extremity of each barb being disposed a greater distance from the shank leading end than the inner extremity of said barb, whereby segments of the applied coating are keyed to the tapered portions of the shanks adjacent the inner extremities of the barbs thereof; each enlarged head of said fasteners having a flattened peripheral segment disposed in substantial tangential relation with the periphery of the shank trailing end; the flattened peripheral segment of one head being in substantial engagement with the shank exterior of the adjacent succeeding fastener of the package.

2. The package of claim 1 wherein said fasteners are arranged in parallel substantially abutting side-by-side relation and the heads of adjacent fasteners are arranged in stepped relation with the head of the leading fastener being disposed beneath the head of the succeeding fastener, the head of each fastener having flattened peripheral segment thereof disposed in substantial tangential engagement with the shank exterior of the adjacent succeeding fastener.

* * * * *